United States Patent
Hang et al.

(10) Patent No.: US 11,246,142 B2
(45) Date of Patent: Feb. 8, 2022

(54) CONTROL CHANNEL TRANSMISSION METHOD, NETWORK DEVICE, NETWORK CONTROLLER, AND TERMINAL DEVICE

(71) Applicant: HUAWEI TECHNOLOGIES CO., LTD., Guangdong (CN)

(72) Inventors: Haicun Hang, Shanghai (CN); Qian Zhang, Shenzhen (CN); Xiaoyan Bi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 56 days.

(21) Appl. No.: 16/673,318

(22) Filed: Nov. 4, 2019

(65) Prior Publication Data

US 2020/0068579 A1 Feb. 27, 2020

Related U.S. Application Data

(63) Continuation of application No. PCT/CN2018/085414, filed on May 3, 2018.

(30) Foreign Application Priority Data

May 5, 2017 (CN) .......................... 201710313471.1

(51) Int. Cl.
*H04W 72/08* (2009.01)
*H04W 72/02* (2009.01)
*H04W 72/04* (2009.01)

(52) U.S. Cl.
CPC ......... *H04W 72/082* (2013.01); *H04W 72/02* (2013.01); *H04W 72/042* (2013.01)

(58) Field of Classification Search
CPC .................................................. H04W 72/082
See application file for complete search history.

(56) References Cited

U.S. PATENT DOCUMENTS

2012/0008586 A1 1/2012 Kwon et al.
2013/0188594 A1* 7/2013 Cesar .................. H04W 72/082
370/329

(Continued)

FOREIGN PATENT DOCUMENTS

CN 104054290 A 9/2014
CN 104469960 A 3/2015

(Continued)

OTHER PUBLICATIONS

MediaTek Inc.:"Multi-TRP and Multi-panel transmission", 3GPP TSG RAN WG1 Meeting #88bis, R1-1704447, Spokane, USA, Apr. 3-7, 2017, total 4 pages. XP051242593.

(Continued)

*Primary Examiner* — John D Blanton
(74) *Attorney, Agent, or Firm* — Womble Bond Dickinson (US) LLP

(57) ABSTRACT

Embodiments of the application provide a control channel transmission method, a network device, a network controller, and a terminal device, to avoid a resource collision between physical downlink control channels (PDCCHs) of a plurality of network devices. The method includes: receiving, by a first network device, resource group indication information sent by a network controller, where a resource indicated by the resource group indication information does not overlap a resource used by another network device; determining, by the first network device, a first search space based on a user equipment UE-specific search space and the resource group indication information; and sending, by the first network device, a first PDCCH to the terminal device through the first search space.

19 Claims, 6 Drawing Sheets

(56) References Cited

U.S. PATENT DOCUMENTS

| | | | | |
|---|---|---|---|---|
| 2014/0192734 A1* | 7/2014 | Ng | ................. | H04L 5/0035 |
| | | | | 370/329 |
| 2018/0279135 A1* | 9/2018 | Hwang | ................. | H04L 5/0094 |
| 2020/0021419 A1* | 1/2020 | Taherzadeh Boroujeni | ................. | |
| | | | | H04L 5/0091 |
| 2020/0389917 A1* | 12/2020 | Kwak | ................. | H04W 74/04 |

FOREIGN PATENT DOCUMENTS

| | | |
|---|---|---|
| CN | 104472003 A | 3/2015 |
| CN | 104509008 A | 4/2015 |
| CN | 104782068 A | 7/2015 |
| CN | 104782206 A | 7/2015 |
| CN | 105122676 A | 12/2015 |
| CN | 106416386 A | 2/2017 |
| CN | 104412678 B | 11/2018 |
| EP | 2466940 B1 | 2/2014 |
| EP | 2842367 B1 | 2/2019 |
| GB | 2500391 B | 10/2014 |
| WO | 2013112003 A1 | 8/2013 |

OTHER PUBLICATIONS

Huawei, HiSilicon:"Search space design considerations", 3GPP TSG RAN WG1 Meeting #88bis, R1-1704202, Spokane, USA, Apr. 3-7, 2017, total 4 pages.

* cited by examiner

CONTROL CHANNEL TRANSMISSION METHOD, NETWORK DEVICE, NETWORK CONTROLLER, AND TERMINAL DEVICE

CROSS-REFERENCE TO RELATED APPLICATIONS

This application is a continuation of International Application No. PCT/CN2018/085414, filed on May 3, 2018, which claims priority to Chinese Patent Application No. 201710313471.1, filed on May 5, 2017. The disclosures of the aforementioned applications are herein incorporated by reference in their entireties.

TECHNICAL FIELD

This application relates to the communications field, and more specifically, to a control channel transmission method, a network device, a network controller, and a terminal device.

BACKGROUND

Coordinated multipoint (CoMP) transmission is a method proposed in Long Term Evolution (LTE), and used to resolve an inter-cell interference problem and increase a cell edge user throughput. In a new radio access technology (NR), a plurality of network devices may simultaneously serve a same terminal device, and perform independent scheduling. In addition, each network device may independently send a physical downlink control channel (PDCCH) to the same terminal device. In this case, the terminal device needs to blindly detect a plurality of PDCCHs, to obtain a plurality of pieces of downlink control information (DCI).

However, resources in a user equipment (UE)-search space of each terminal device are limited. When a plurality of network devices simultaneously send a plurality of PDCCHs to a same terminal device, a resource collision is likely to occur. To be specific, when at least two network devices send respective PDCCHs on a same time-frequency resource, DCI cannot be correctly received. Consequently, data transmission between the network devices and the terminal device is affected. In other words, transmission reliability is affected.

Therefore, how to avoid a resource collision between PDCCHs of a plurality of network devices and ensure reliable transmission of a control channel becomes a technical problem that urgently needs to be resolved.

SUMMARY

This application provides a control channel transmission method, a network device, a network controller, and a terminal device, to avoid a resource collision between PDCCHs of a plurality of network devices.

According to a first aspect, a control channel transmission method is provided. The method includes:

receiving, by a first network device, a resource group indication information sent by a network controller, where a resource indicated by the resource group indication information does not overlap a resource used by another network device;

determining, by the first network device, a first search space based on a user equipment (UE)-specific search space of a terminal device and the resource group indication information; and sending, by the first network device, a first physical downlink control channel PDCCH to the terminal device through the first search space.

A resource in the first search space belongs to the UE-specific search space and belongs to the first resource group.

The first network device sends the first physical downlink control channel PDCCH to the terminal device through the first search space.

When the terminal device accesses two or more network devices, or resources in two or more UE-specific search spaces of the terminal device overlap, two or more network devices may use a same time-frequency resource to send PDCCHs. In other words, a resource collision occurs. In this case, interference may occur between the PDCCHs sent by the two or more network devices. Consequently, the terminal device cannot correctly receive DCI, data between the network device and the terminal device is affected, and data transmission reliability is affected.

In this embodiment of the present invention, an available resource group is allocated to the first network device by using the network controller, and the resource group does not overlap a resource in a resource group used by the another network device (for example, a second network device). In other words, a resource in each resource group is available for only a corresponding network device, so that the network device determines an available resource based on the resource group allocated to the network device, and sends a PDCCH on the resource. In other words, the resource used by each network device to send the PDCCH is limited to the resource in the resource group, so that a resource collision is avoided. In other words, PDCCH transmission reliability is improved, facilitating improving data transmission reliability.

In one embodiment, the UE-specific search space of the terminal device includes a plurality of subspaces, and the plurality of subspaces are discretely distributed in the plurality of resource groups.

Specifically, each subspace may correspond to one time-frequency resource in a control resource area, and time-frequency resources occupied by the plurality of subspaces are discretely distributed in the plurality of resource groups.

In one embodiment, a quantity of control channel elements CCEs included in each subspace depends on an aggregation level.

In this design, the quantity of CCEs included in each subspace may be the same as a value of the aggregation level. In this design, the UE-specific search space may be distributed as evenly as possible in the control resource set.

In one embodiment, a quantity of CCEs included in each subspace depends on a quantity of network devices accessed by the terminal device.

In this design, CCE resources included in each subspace may be continuous, and the plurality of subspaces may be discretely distributed in the control resource set.

In one embodiment, the method further includes:

sending, by the first network device, resource group indication information to the terminal device, where the resource group indication information is used to indicate a resource location of a resource group used by the first network device.

A resource location of the first resource group is indicated to the terminal device, so that the terminal device can determine, based on the location of the first resource group and the UE-specific search space, the first search space corresponding to the PDCCH sent by the first network device.

In other words, the terminal device may determine, according to second indication information sent by the plurality of network devices, resource locations of the plurality of resource groups corresponding to the plurality of network devices, and then determine, based on the resource locations of the plurality of resource groups and the UE-specific search space, a plurality of search spaces corresponding to the PDCCHs sent by the plurality of network devices.

The terminal device may perform blind detection in the plurality of search spaces. For each search space, if the terminal device finds a PDCCH belonging to the terminal device, the terminal device stops detection in the search space. Therefore, this helps reduce a calculation amount of the terminal device.

According to a second aspect, a control channel transmission method is provided. The method includes:

allocating, by a network controller based on a quantity of network devices accessed by a terminal device, a plurality of resource groups to the plurality of network devices accessed by the terminal device from a preconfigured control resource set, where the plurality of resource groups correspond one-to-one to the plurality of network devices, and resources in any two of the plurality of resource groups do not overlap; and sending, by the network controller, a plurality of pieces of resource group indication information to the plurality of network devices, where the plurality of pieces of resource group indication information correspond one-to-one to the plurality of network devices, and the resource group indication information is used to indicate a resource location of a resource group available for the network device. It should be understood that the network controller may be a separate physical device, or may be a software and/or hardware functional module integrated into the network device. This is not particularly limited in the present invention.

In this embodiment of the present invention, the network controller divides the control resource set into a plurality of resource groups in advance. The plurality of resource groups correspond one-to-one to the plurality of network devices, and each resource group is available for only a corresponding network device. The network controller separately sends resource location indication information (namely, the resource group indication information) of the plurality of resource groups to the plurality of network devices, so that each network device determines an available resource based on the resource group allocated to the network device, and sends a PDCCH on the resource. In other words, the resource used by each network device to send the PDCCH is limited to the resource in the resource group, so that a resource collision is avoided. In other words, PDCCH transmission reliability is improved, facilitating improving data transmission reliability.

In one embodiment, the determining, by a network controller based on a quantity of network devices accessed by a terminal device, a plurality of resource groups in a preconfigured control resource set includes:

determining, by the network controller, the plurality of resource groups in the preconfigured control resource set according to a preset rule and based on the quantity of network devices accessed by the terminal device.

In one embodiment, the preset rule includes: evenly allocating resources in the control resource set based on the quantity of network devices accessed by the terminal device, to obtain the plurality of resource groups.

This resource division manner is relatively simple, and the network controller can evenly allocate the resources in the control resource set based on the quantity of network devices accessed by the terminal device, to obtain the plurality of resource groups.

In one embodiment, the preset rule includes: proportionally allocating resources in the control resource set based on channel quality of a plurality of channels between the terminal device and the plurality of network devices, to obtain the plurality of resource groups.

This resource division manner is relatively flexible, and the resources allocated to the network devices can be adaptively adjusted based on the channel quality.

According to a third aspect, a control channel transmission method is provided. The method includes:

determining, by a terminal device, a plurality of resource groups in a preconfigured control resource set, where the plurality of resource groups correspond one-to-one to a plurality of network devices accessed by the terminal device, and any two of the plurality of resource groups do not overlap;

determining, by the terminal device, a plurality of search spaces based on a user equipment UE-specific search space and the plurality of resource groups; and receiving, by the terminal device in the plurality of search spaces, a plurality of pieces of physical downlink control information PDCCHs sent by the plurality of network devices, where the plurality of network devices correspond one-to-one to the plurality of PDCCHs.

A resource in each search space belongs to one resource group, and resources in the plurality of search spaces all belong to the UE-specific search space.

When the terminal device accesses two or more network devices, or resources in two or more UE-specific search spaces of the terminal device overlap, two or more network devices may use a same time-frequency resource to send PDCCHs. In other words, a resource collision occurs. In this case, interference may occur between the PDCCHs sent by the two or more network devices. Consequently, the terminal device cannot correctly receive DCI, data between the network device and the terminal device is affected, and data transmission reliability is affected.

In this embodiment of the present invention, the plurality of resource groups are allocated to the plurality of network devices accessed by the terminal device, the plurality of resource groups correspond one-to-one to the plurality of network devices, and each resource group is available for only a corresponding network device, so that the network device determines an available resource based on the resource group allocated to the network device, and sends the PDCCH on the resource. In other words, the resource used by each network device to send the PDCCH is limited to the resource in the resource group, so that a resource collision is avoided. In other words, PDCCH transmission reliability is improved, facilitating improving data transmission reliability.

In one embodiment, the determining, by a terminal device, a plurality of resource groups in a preconfigured control resource set includes:

determining, by the terminal device, the plurality of resource groups in the preconfigured control resource set according to a predefined rule.

In one embodiment, the preset rule includes: evenly allocating resources in the control resource set based on the quantity of network devices accessed by the terminal device, to obtain the plurality of resource groups.

In one embodiment, the preset rule includes: proportionally allocating resources in the control resource set based on channel quality of a plurality of channels between the terminal device and the plurality of network devices, to obtain the plurality of resource groups.

This resource division manner is relatively flexible, and the resources allocated to the network devices can be adaptively adjusted based on the channel quality.

In one embodiment, the determining, by a terminal device, a plurality of resource groups in a preconfigured control resource set includes:

receiving, by the terminal device, a plurality of pieces of resource group indication information sent by the plurality of network devices, where the plurality of pieces of resource group indication information correspond one-to-one to the plurality of network devices, and the resource group indication information is used to indicate a resource location of a resource group available for the network device. The terminal device may determine, according to second indication information sent by the plurality of network devices, resource locations of the plurality of resource groups corresponding to the plurality of network devices, and then determine, based on the resource locations of the plurality of resource groups and the UE-specific search space, a plurality of search spaces corresponding to the PDCCHs sent by the plurality of network devices.

The terminal device may perform blind detection in the plurality of search spaces. For each search space, if the terminal device finds a PDCCH belonging to the terminal device, the terminal device stops detection in the search space. Therefore, this helps reduce a calculation amount of the terminal device.

In one embodiment, the UE-specific search space of the terminal device includes a plurality of subspaces, and the plurality of subspaces are discretely distributed in the plurality of resource groups.

Specifically, each subspace may correspond to one time-frequency resource in a control resource area, and time-frequency resources occupied by the plurality of subspaces are discretely distributed in the plurality of resource groups.

In one embodiment, a quantity of control channel elements CCEs included in each subspace depends on an aggregation level.

In this design, the quantity of CCEs included in each subspace may be the same as a value of the aggregation level. In this design, the UE-specific search space may be distributed as evenly as possible in the control resource set.

In one embodiment, a quantity of CCEs included in each subspace depends on the quantity of network devices accessed by the terminal device.

In this design, CCE resources included in each subspace may be continuous, and the plurality of subspaces may be discretely distributed in the control resource set.

According to a fourth aspect, a network device is provided. The network device includes modules configured to perform the control channel transmission method according to any one of the first aspect or the possible implementations of the first aspect.

According to a fifth aspect, a network controller is provided. The network controller includes modules configured to perform the control channel transmission method according to any one of the second aspect or the possible implementations of the second aspect.

According to a sixth aspect, a terminal device is provided. The terminal device includes modules configured to perform the control channel transmission method according to any one of the third aspect or the possible implementations of the third aspect.

According to a seventh aspect, a network device is provided. The network device includes a transceiver, a processor, and a memory. The processor is configured to control the transceiver to send and receive a signal. The memory is configured to store a computer program. The processor is configured to invoke the computer program from the memory and run the computer program, so that the network device performs the method according to any one of the first aspect or the possible implementations of the first aspect.

According to an eighth aspect, a network controller is provided. The network controller includes a transceiver, a processor, and a memory. The processor is configured to control the transceiver to send and receive a signal. The memory is configured to store a computer program. The processor is configured to invoke the computer program from the memory and run the computer program, so that the network device performs the method according to any one of the second aspect or the possible implementations of the second aspect.

According to a ninth aspect, a terminal device is provided. The terminal device includes a transceiver, a processor, and a memory. The processor is configured to control the transceiver to send and receive a signal. The memory is configured to store a computer program. The processor is configured to invoke the computer program from the memory and run the computer program, so that the terminal device performs the method according to any one of the third aspect or the possible implementations of the third aspect.

According to a tenth aspect, a computer program product is provided. The computer program product includes computer program code. When the computer program code is run by a network device, the network device is enabled to perform the method according to any one of the first aspect or the possible implementations of the first aspect.

According to an eleventh aspect, a computer program product is provided. The computer program product includes computer program code. When the computer program code is run by a network controller, the network controller is enabled to perform the method according to any one of the second aspect or the possible implementations of the second aspect.

According to a twelfth aspect, a computer program product is provided. The computer program product includes computer program code. When the computer program code is run by a terminal device, the terminal device is enabled to perform the method according to any one of the third aspect or the possible implementations of the third aspect.

According to a thirteenth aspect, a computer-readable medium is provided. The computer-readable medium stores program code, and the program code includes an instruction used to perform the method according to any one of the first aspect to the third aspect or the possible implementations of the first aspect to the third aspect.

According to a fourteenth aspect, a processing apparatus is provided. The processing apparatus includes a processor and an interface. The processor is configured to perform the method according to any one of the first aspect to the third aspect or the possible implementations of the first aspect to the third aspect. Related data exchange (for example, performing data transmission or receiving transmitted data) is completed through the interface. In a specific implementation process, the interface may further complete the foregoing data exchange process by using a transceiver.

It should be understood that the processing apparatus in the fourteenth aspect may be a chip. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, may be located outside the processor, or may exist independently.

In this application, a plurality of resource groups in which resources do not overlap each other are allocated to a plurality of network devices, so that resources available for the network devices to send PDCCHs do not overlap, thereby avoiding a resource collision and improving PDCCH transmission reliability.

DESCRIPTION OF EMBODIMENTS

The following describes the technical solutions of this application with reference to the accompanying drawings.

It should be understood that the technical solutions in this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an advanced long term evolution (LTE-A) system, a universal mobile telecommunications system (UMTS), or a next-generation communications system (for example, a fifth-generation (5G) communications system). The 5G system may be also referred to as a new radio access technology (NR) system.

For ease of understanding embodiments of the present invention, a communications system applicable to the embodiments of the present invention is first described in detail with reference to FIG. 1.

Figure 1:
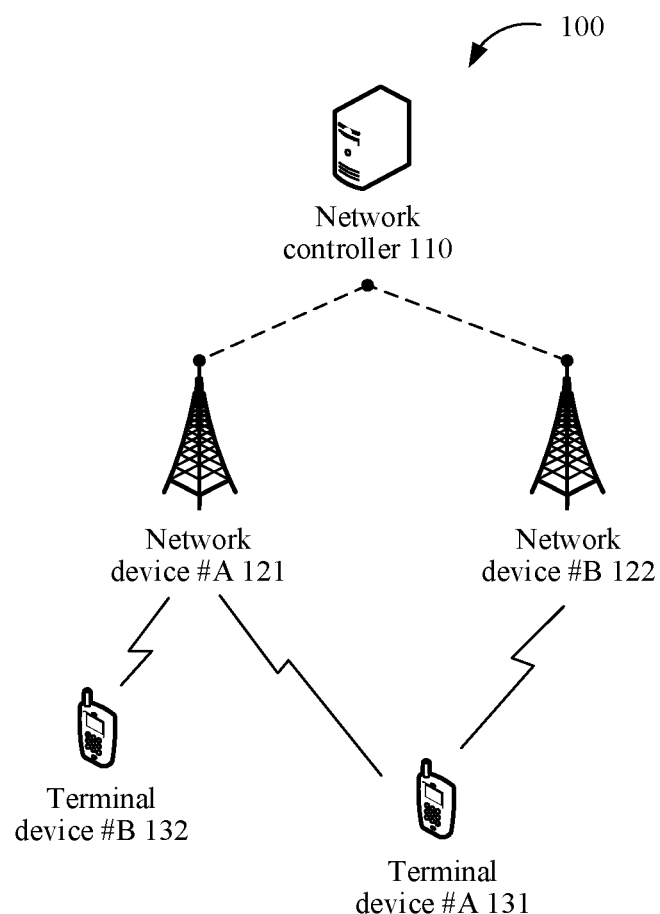
FIG. 1 is a schematic diagram of a communications system applicable to a control channel transmission method according to an embodiment of the present invention.

FIG. 1 is a schematic diagram of a communications system 100 applicable to a control channel transmission method according to an embodiment of the present invention. As shown in FIG. 1, the communications system 100 includes a network controller 110, at least one network device (for example, a network device #A 121 and a second network device #B 122 shown in the figure), and at least one terminal device (for example, a terminal device #A 131 and a terminal device #B 132 shown in the figure).

The network device (for example, the network device #A 121 or the network device #B 122) may be a base transceiver station (BTS) in a global system for mobile communications (GSM) system or in a code division multiple access (CDMA) system, may be a NodeB (NB) in wideband code division multiple access (WCDMA), may be an evolved NodeB (evolutional node B, eNB or eNodeB) in long term evolution (LTE), may be a relay station, an access point, or a remote radio unit (RRU), or may be a vehicle-mounted device, a wearable device, and a network side device in a future 5G system, such as a transmission point (TP), a transmission reception point (TRP), a base station, or a small cell device. This is not particularly limited in this embodiment of the present invention.

The terminal device (for example, the terminal device #A 131 or the terminal device #B 132) may be movable or fixed. The terminal device may communicate with one or more core networks (core network) over a radio access network (RAN). The terminal device may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal device may be a station (ST) in a wireless local area network (WLAN), may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device and a next-generation communications system, for example, a terminal device in a 5G network, or a terminal device in a future evolved public land mobile network (PLMN). This is not particularly limited in this embodiment of this application.

The communications system 100 may support CoMP transmission. To be specific, a plurality of cells or a plurality of transmission points may be coordinated to send data to a same terminal device on a same time-frequency resource, or send data to a same terminal device on partially overlapping time-frequency resources. The plurality of cells may belong to a same network device or different network devices, and may be selected based on a channel gain or a path loss, received signal strength, a received signal instruction, or the like.

The terminal device (for example, the terminal device #A 131) in the communications system 100 may support multipoint transmission. To be specific, the terminal device #A 131 may communicate with the network device #A 121, or may communicate with the network device #B 122. The network device #A 121 may be used as a serving network device. The serving network device is a network device that provides services such as an RRC connection, non-access stratum (NAS) mobility management, and security input for the terminal device by using a wireless air interface protocol.

In one embodiment, the network device #A 121 may be a serving network device, and the network device #B 122 may be a coordinating network device. Alternatively, the network device #A 121 may be a coordinating network device, and the network device #B 122 is a serving network device.

In this embodiment of the present invention, the network device #A 121 and the network device #B 122 may be controlled and/or scheduled by the network controller 110. The network controller 110 may perform central resource scheduling and management on a plurality of controlled network devices (including the network device #A 121 and the network device #B 122) based on information obtained from and maintained by the network devices. For example, the network controller 100 sends control messages and/or indication information and the like to the plurality of controlled network devices.

It should be understood that the network controller 110 may be an independent physical device (as shown in FIG. 1), or may be a software and/or hardware functional module integrated into a network device. This is not particularly limited in the present invention.

In NR, a network device (which may be, for example, the network device #A 121) first accessed by a terminal device (which may be, for example, the terminal device #A 131) is referred to as a serving network device. After being powered on, the terminal device #A 131 may select a suitable cell or an admissible cell through cell search, and then complete a connection to a network side in an attach procedure. After completing the attach procedure, the terminal device #A 131 may perform data communication with the network device #A 121.

In a process of data communication between the terminal device #A 131 and the network device #A 121, the terminal device #A 131 may further access another network device (for example, the network device #B 122). The network device #B 122 may listen to data exchange between the terminal device #A 131 and the network, to infer that a serving network device of the terminal device #A 131 is not the network device #B 122. Therefore, the network device #B 122 may determine that the network device #B 122 is a coordinating network device of the terminal device #A 131.

The terminal device (for example, the terminal device #B 132) in the communications system 100 may also support single-point transmission. To be specific, the terminal device #B 132 may communicate with only the network device #A 121.

It should be understood that FIG. 1 is merely a simplified schematic diagram of an example for ease of understanding. The communications system 100 may further include another network device and/or terminal device. In addition, a same terminal device may further perform CoMP transmission with more network devices. This is not shown in FIG. 1.

In this embodiment of the present invention, in a CoMP scenario, both a serving network device and a coordinating network device may send control signaling and data to a terminal device. For example, the serving network device and the coordinating network device may simultaneously send control signaling to the terminal device. Alternatively, the serving network device and the coordinating network device may simultaneously send data to the terminal device. Alternatively, the serving network device and the coordinating network device may simultaneously send control signaling to the terminal device.

Before the network device and the terminal device perform data transmission, the terminal device needs to receive (or rather, blindly detect) downlink control information (downlink control Information, DCI) on a PDCCH, to receive downlink data on a physical downlink shared channel (physical downlink share channel, PDSCH) according to an indication of the DCI.

In the CoMP scenario, a plurality of network devices may all send PDCCHs to a same terminal device, and in addition, for a specific terminal device, a resource occupied by a UE-specific search space (UE-specific search space) may be determined. A resource collision is likely to occur when the plurality of network devices send a plurality of PDCCHs in the UE-specific search space. Therefore, when the plurality of network devices send the plurality of PDCCHs in the UE-specific search space, once a resource collision occurs, to be specific, two or more network devices send PDCCHs by using a same time-frequency resource, interference may be caused between the PDCCHs sent by the two or more network devices. Consequently, the terminal device cannot correctly receive DCI, and data transmission between the network device and the terminal device is affected, affecting data transmission reliability.

In view of this, this application provides a control channel transmission method, to avoid a resource collision between PDCCHs of a plurality of network devices, thereby ensuring reliable control channel transmission.

For ease of understanding the embodiments of the present invention, several terms in the embodiments of the present invention are first briefly described.

(1) Control channel:

The control channel in this application may be used to carry resource scheduling information and other control information. For example, the control channel may be a PDCCH, an enhanced physical downlink control channel (EPDCCH), a new radio physical downlink control channel (NR-PDCCH), and another downlink channel that is defined with evolution of a network and that has the foregoing functions, or may be an uplink control channel, for example, a physical uplink control channel (PUCCH). For ease of description below, the control channel transmission method in the embodiments of the present invention is described in detail by using only the PDCCH as an example. It should be understood that a channel may also be referred to as a signal or another name. This is not particularly limited in the embodiments of the present invention.

(2) Control channel element (CCE), resource element group (REG), and aggregation level (aggregation level, AL):

The REG may be understood as a basic unit for physical resource allocation according to downlink control signaling, and is used to define mapping from downlink control signaling to a resource element (RE). In a current protocol (for example, an LTE protocol), it is specified that one CCE includes nine REGs, and one REG includes four REs that are contiguous in frequency domain and none of the four resources includes a reference signal (reference signal, RS). In other words, one CCE includes 36 REs.

One PDCCH can be transmitted on L contiguous CCEs, and each CCE includes nine REGs. L is an aggregation level, and indicates a quantity of CCEs included in the search space. For example, a value of L may be 1, 2, 4, or 8, or may even be 16 or 32. The value of the aggregation level is not particularly limited in the embodiments of the present invention.

(3) Search space:

The search space is used as a search scope of blind detection of a terminal device, and a concept of the search space is defined in a current protocol (for example, an LTE protocol). The search space may include a common search space (common search space) and a UE-specific search space. The common search space is used to transmit cell-level common information, which may include, for example, control information related to paging, a random access response (RAR), and a broadcast control channel (BCCH). The UE-specific search space is used to transmit terminal device (or UE)-level information, which may include, for example, control information related to a downlink shared channel (DL-SCH) and an uplink shared channel (UL-SCH).

It should be understood that the common search space and the UE-specific search space are two types of search spaces defined in the LTE protocol. In the embodiments of this application, the UE-specific search space is used as an example for description, but this should not be construed as any limitation on this application. A possibility of re-dividing or redefining the search space is not excluded in this application. Any resource used to transmit the terminal device-level information may be defined as the UE-specific search space in the embodiments of this application.

One search space is defined for a CCE aggregation level. One terminal device may have a plurality of search spaces, and CCEs in each search space may be contiguously distributed. The terminal device needs to listen on a group of PDCCH control channels. The group of PDCCH control channels that are listened on may be referred to as a "candidate control channel set (candidate control channel set)" or "control channel candidates (PDCCH candidates)".

Table 1 shows a correspondence among an aggregation level L, a quantity $N_{CCE,k}$ of available CCEs (or referred to as a search space size), and a quantity of PDCCH candidates that need to be listened on in a specific search space.

TABLE 1

| | Search space $S_k^{(L)}$ | | |
|---|---|---|---|
| Type | Aggregation level L [in CCEs] | Size [in CCEs] | Quantity $M^{(L)}$ of PDCCH candidates |
| UE-specific | 1 | 6 | 6 |
| | 2 | 12 | 6 |
| | 4 | 8 | 2 |
| | 8 | 16 | 2 |

It can be learned that, at different aggregation levels, search space sizes are different, and quantities of PDCCH candidates are also different. In addition, the search space size $M = M^{(L)} * L$. In other words, the quantity of CCEs included in the search space is a product of the aggregation level and the quantity of PDCCH candidates.

It should be understood that, a correspondence among parameters is described in Table 1 for ease of understanding with reference to the aggregation level L, the search space size $N_{CCE,k}$, and the quantity $M^{(L)}$ of PDCCH candidates that need to be listened on in the specific search space and that are defined in an LTE protocol. This shall not constitute any limitation on the embodiments of the present invention, and this application does not exclude a possibility that the correspondence among the aggregation level L, the search space size $N_{CCE,k}$ and the quantity $M^{(L)}$ of PDCCH candidates needing to be listened on in the specific search space is redefined in a future protocol, and does not exclude a possibility of defining more parameters either.

Figure 2:
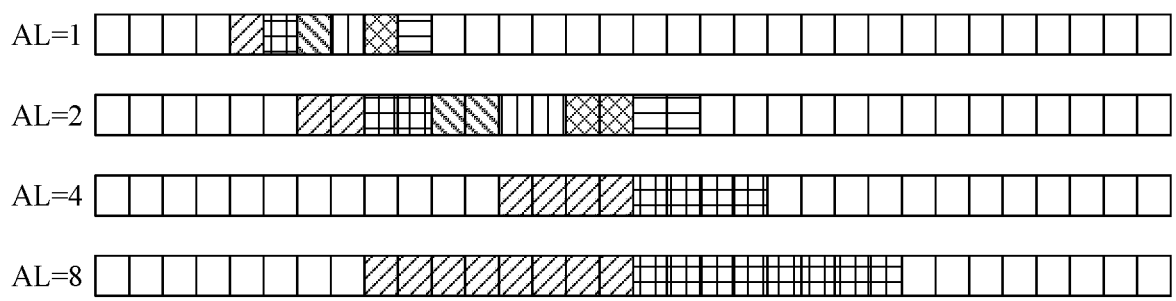
FIG. 2 is a schematic diagram of distribution of candidate locations of PDCCHs at different aggregation levels as specified in a current protocol.

FIG. 2 is a schematic diagram of distribution of UE-specific search spaces at different aggregation levels specified in a current protocol. As shown in FIG. 2, when AL=1, each search space size is one CCE, the quantity of PDCCH candidates is 6, the search spaces size is six CCEs, and the six CCEs are contiguously distributed in a time-frequency resource. When AL=2, each search space size is two CCEs, the quantity of PDCCH candidates is 6, and the search space size is 12 CCEs. The rest may be deduced by analogy. For brevity, no enumeration is provided herein.

It should be noted that the search spaces at a same aggregation level that are shown in the figure correspond to different shadow areas, and each type of shadow indicates a candidate location of the PDCCH. For brevity, description of a same or similar case is omitted below.

(4) Control Resource Set

Control channels may be divided into a plurality of control resource sets, and each control resource set is a set of a group of REGs. A terminal device may listen on a PDCCH on one or more control resource sets.

In the embodiments of the present invention, for a network device, the control resource set may be understood as a resource occupied for sending a control channel. For the terminal device, each search space of the PDCCH of the terminal device belongs to the control resource set. Alternatively, the network device may determine, in the control resource set, a resource used to send the PDCCH, and the terminal device may determine a search space of the PDCCH in the control resource set. The control resource set may include a time-frequency resource. For example, the time-frequency resource may be a segment of bandwidth, or one or more subbands in frequency domain; may be a quantity of time units in time domain, for example, a quantity of symbols in a subframe, a slot, or a mini-slot; or may be contiguous or discontiguous resource elements in time-frequency domain, for example, contiguous resource blocks (RB) or discontiguous RBs.

It should be understood that specific content of the foregoing listed frequency domain resource, time domain resource, and time-frequency domain resource is merely used an example for description, and should not be construed as any limitation on the embodiments of the present invention. For example, an RB may be defined as a resource defined in an existing LTE protocol, or may be defined as a resource defined in a future protocol, or may be replaced with another name. For another example, a time unit may be a subframe; or may be a slot; or may be a radio frame, a mini-slot (mini slot or sub slot), a plurality of aggregated slots, a plurality of aggregated subframes, a symbol, or the like; or may even be a transmission time interval (TTI). This is not particularly limited in the embodiments of this application.

The embodiments of the present invention are described in detail below with reference to the accompanying drawings.

Figure 3:
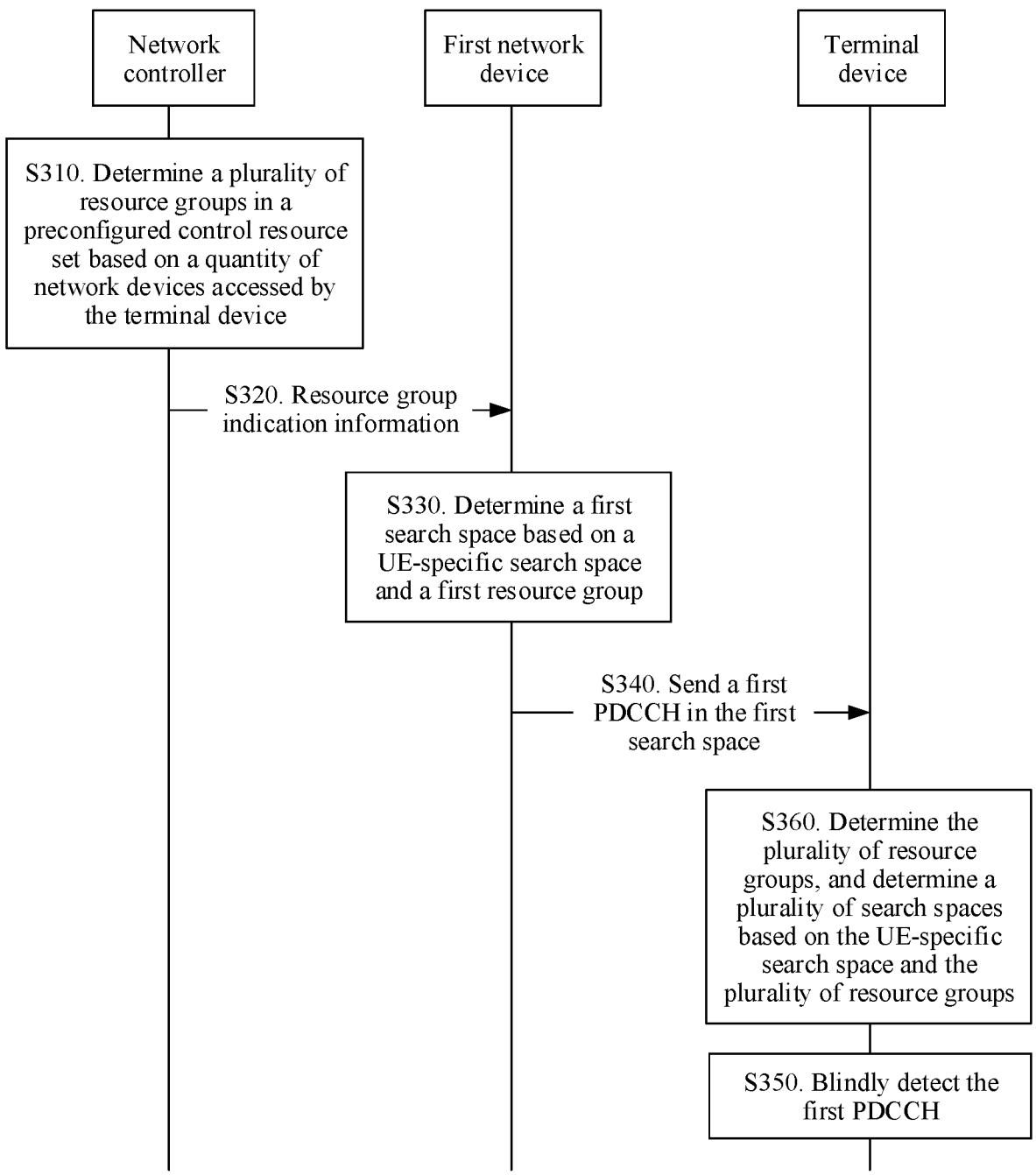
FIG. 3 is a schematic flowchart of a control channel transmission method according to an embodiment of the present invention.

FIG. 3 shows a schematic flowchart of a control channel transmission method 300 according to an embodiment of the present invention from a perspective of device interaction. It should be understood that the method 300 may be applied to a wireless communications system. The communications system may include a network controller, a network device, and a terminal device. A plurality of network devices may transmit data to the terminal device through CoMP. For example, the communications system may be the communications system 100 shown in FIG. 1. The network controller may be the network controller 110 in FIG. 1. The plurality of network devices may include a network device

1 and a network device #2 that transmit data to a same terminal device. The network device #1 may be the network device #A 121 in FIG. 1. The network device #2 may be the network device #B 122 in FIG. 1. Alternatively, the network device #1 may be the network device #B 122 in FIG. 1, and the network device #2 may be the first network device #A 121 in FIG. 1. The terminal device may be the first terminal device #A 131 in FIG. 1.

As shown in FIG. 3, the method 300 includes the following operations.

S310. The network controller determines a plurality of resource groups in a preconfigured control resource set based on a quantity of network devices accessed by the terminal device.

Specifically, the network controller may learn of a connection relationship between each network device and the terminal device in the communications system. Therefore, the network controller may determine the quantity of network devices accessed by each terminal device. In this embodiment of the present invention, the network controller may determine the plurality of resource groups in the preconfigured control resource set based on the quantity of network devices accessed by the terminal device. The plurality of resource groups correspond one-to-one to the plurality of network devices accessed by the terminal device. For example, the terminal device accesses the network device #1 and the network device #2. In this case, the network controller divides the control resource set into two resource groups, which may be respectively denoted as a resource group #1 and a resource group #2. The resource group #1 can be used by only the network device #1, and the resource group #2 can be used by only the network device #2.

In one embodiment, the network controller may determine the plurality of resource groups in the preconfigured control resource set according to a preset rule and based on the quantity of network devices accessed by the terminal device.

Specifically, the preset rule may be any one of the following rules.

Rule 1: Evenly allocate resources in the control resource set based on the quantity of network devices accessed by the terminal device, to obtain the plurality of resource groups.

It is assumed that a quantity of CCEs included in the control resource set is N. When the quantity of network devices is n, a quantity of CCEs occupied by a resource allocated by the network controller to each network device is N/n. If N cannot be exactly divided by n, N/n may be rounded up or rounded down. In other words, a quantity K of CCEs included in a resource group allocated to each network device is $K=\lfloor N/n \rfloor$ or $K=\lceil N/n \rceil$.

In one embodiment, the CCEs in the resource group of each network device are contiguous. For example, in the N CCEs, a number range of the CCEs included in the resource group #1 corresponding to the network device #1 is [1, K], a number range of the CCEs included in the resource group #2 corresponding to the network device #2 is [K+1, 2K], a number range of the CCEs included in a resource group (which is, for example, denoted as a resource group #3) corresponding to still another network device (which is, for example, denoted as a network device #3) is [2K+1, 3K], and so on. No enumeration is provided herein.

It should be understood that the listed numbers of the CCEs in the resource groups are used merely as examples for description, and shall not constitute any limitation on this embodiment of the present invention. For example, the numbers of the N CCEs may be sequentially increased starting from any positive integer.

Figure 4:
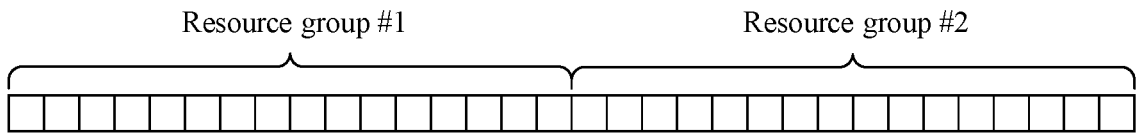
FIG. 4 is a schematic diagram of allocating resource groups according to a preset rule according to an embodiment of the present invention.

FIG. 4 is a schematic diagram of allocating resource groups according to the preset rule according to this embodiment of the present invention. As shown in FIG. 4, assuming that resources in the control resource set are on one subcarrier and occupy 32 contiguous CCEs, and the quantity of network devices is 2, the control resource set may be evenly divided into two resource groups, and each resource group includes 16 CCEs. In the N CCEs, the number range of the CCEs included in the resource group #1 is [1, 16], and the number range of the CCEs included in the resource group #2 is [17, 32].

It should be understood that the foregoing specific manner of the CCEs occupied by the resource group allocated by the network controller to each network device is merely an example for description, and shall not constitute any limitation on this embodiment of the present invention.

It should be further understood that the foregoing method for indicating the resource group by using the CCE number is merely a possible implementation. When the CCEs in the resource group are a plurality of contiguous CCEs, indication may alternatively be performed in any one of the following manners: a start address and the quantity of the CCEs, a start address and an end address of the CCEs, or an end address and the quantity of the CCEs.

Figure 5:
FIG. 5 is another schematic diagram of allocating resource groups according to a preset rule according to an embodiment of the present invention.

For example, the CCEs in the resource group of each network device may alternatively be discontiguous. FIG. 5 is another schematic diagram of allocating resource groups according to the preset rule according to this embodiment of the present invention. As shown in FIG. 5, assuming that resources in the control resource set are on one subcarrier and occupy 32 contiguous CCEs, and the quantity of network devices is 2, the control resource set may be evenly divided into two resource groups (for example, including the resource group #1 and the resource group #2), and each resource group includes 16 CCEs. In the N CCEs, the number range of the CCEs included in the resource group #1 is [1, 3, . . . , 31], and the number range of the CCEs included in the resource group #2 is [2, 4, . . . , 32].

Rule 2: Proportionally allocate resources in the control resource set based on channel quality of a plurality of channels between the terminal device and the plurality of network devices, to obtain the plurality of resource groups.

It may be understood that, when the channel quality between the network device and the terminal device is relatively good, an aggregation level used by the PDCCH may be relatively low. For example, the aggregation level may be 1 or 2. On the contrary, when the channel quality between the network device and the terminal device is relatively poor, an aggregation level used by the PDCCH may be relatively high. For example, the aggregation level may be 4 or 8, or even a larger value. Correspondingly, when the aggregation level is relatively low, relatively few resources may be allocated to a network device corresponding to the relatively low aggregation level. When the aggregation level is relatively high, relatively many resources may be allocated to a network device corresponding to the relatively high aggregation level.

In one embodiment, the channel quality between the terminal device and the network device depends on a reference signal receiving power (RSRP). The RSRP may be receive power of an uplink reference signal. For example, the uplink reference signal may be a sounding reference signal (sounding reference signal, SRS).

It is assumed that the quantity of CCEs included in the control resource set is N. When the quantity of network devices is 2 (for example, including the network device #1 and the network device #2), a ratio of receive power for receiving a same SRS by the network device #1 to the receive power for receiving the same SRS by the network device #2 is u:v. In this case, a quantity of CCEs occupied by a resource allocated by the network controller to the network device #1 is $$\frac{v}{u+v}N,$$

and a quantity of CCEs occupied by a resource allocated by the network controller to the network device #2 is $$\frac{u}{u+v}N.$$

If N cannot be exactly divided by (u+v), N/(u+v) may be rounded up or rounded down.

Figure 6:
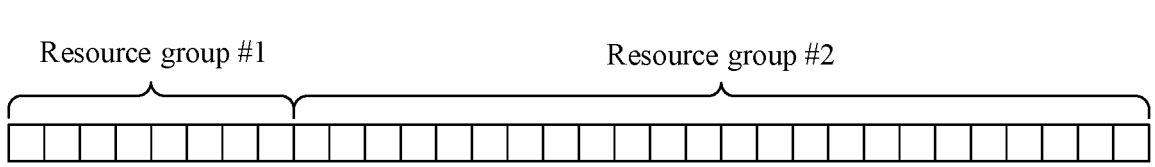
FIG. 6 is still another schematic diagram of allocating resource groups according to a preset rule according to an embodiment of the present invention.

FIG. 6 is still another schematic diagram of allocating resource groups according to the preset rule according to this embodiment of the present invention. As shown in FIG. 6, it is assumed that resources in the control resource set are on one subcarrier and occupy 32 contiguous CCEs, and the quantity of network devices is 2 (for example, including the network device #1 and the network device #2). The network device #1 and the network device #2 each may determine a resource allocation ratio based on a ratio of receive power for receiving an SRS. For example, if the ratio of the receive power for receiving the SRS by the network device #1 to the receive power for receiving the SRS by the network device #2 is 1:2, it may be determined that a ratio of resources allocated to the network device #1 to resources allocated to the network device #2 (namely, a resource ratio of the resource group #2 to the resource group #1) is 2:1.

In one embodiment, CCEs in a resource group of each network device are contiguous or discontiguous.

It can be learned from the above that, regardless of whether the CCEs in the resource group of the network device are contiguous or discontiguous, after any CCE is allocated to a network device, the CCE cannot be used by another network device. In other words, in the plurality of resource groups allocated to the plurality of network devices, resources in resource groups of any two network devices do not overlap.

S320. The network controller sends a plurality of pieces of resource group indication information to the plurality of network devices. The resource group indication information is used to indicate a resource location of a resource group available for the network device.

In this embodiment of the present invention, for ease of differentiation and description, the resource group indication information sent by the network controller to the network device is denoted as first indication information, and resource group indication information that is sent by the network device to the terminal device and that is mentioned below is denoted as second indication information.

It should be understood that, for a same network device, the first indication information received by the network device and the second indication information sent by the network device may be same indication information. For example, the network device may directly forward the received first indication information to the terminal device. Therefore, information carried in the first indication information and information carried in the second indication information may be completely the same. Alternatively, the first indication information received by the network device and the second indication information sent by the network device may be different indication information. For example, the network device modifies the received first indication information or regenerates the second indication information. However, content carried in the first indication information and content carried in the second indication information are essentially the same, and both are used to indicate a resource location of a same resource group.

Specifically, after determining a resource group available for each network device, the network controller may separately send the first indication information to a plurality of controlled network devices, in other words, send a plurality of pieces of first indication information in a one-to-one correspondence with the plurality of network devices. Each piece of the first indication information is used to indicate the resource location of the resource group available for the corresponding network device. Two network devices, the network device #1 and the network device #2, are used as an example. The network controller may send indication information #1 (namely, an example of the first indication information) to the network device #1, and send indication information #2 (namely, another example of the first indication information) to the network device #2.

Herein, it should be noted that the resource group available for the network device is a set of resources available for the network device to send a PDCCH to the terminal device. After being allocated to a network device (for example, the network device #1), the resource group can be used only by the network device (namely, the network device #1), and cannot be used by another network device (for example, the network device #2), unless the network controller re-divides the control resource set, and notifies a corresponding network device by using indication information.

Without loss of generality, the following uses a first network device as an example to describe in detail a specific process in which the network device determines, according to the indication information sent by the network controller, a search space (denoted as a first search space for ease of differentiation and description) used to send a PDCCH. It may be understood that the first network device may be the foregoing listed network device #1 or network device #2, and the first resource group may be the foregoing listed resource group #1 allocated to the network device #1 or the foregoing listed resource group #2 allocated to the network device #2. This is not limited in this embodiment of the present invention.

In S320, the first network device receives the indication information (denoted as the first indication information for ease of differentiation and description) sent by the network controller. The first indication information is used to indicate a location of the first resource group.

Specifically, the first indication information may directly indicate a number range of CCEs in the control resource set, where the CCEs are included in the first resource group allocated by the network controller to the first network device, or may indicate a rule (for example, may indicate an index of the rule) for the network device to allocate a resource to the first network device, so that the first network device determines, according to the rule, the first resource group allocated by the network controller to the first network device.

S330. The first network device determines a first search space based on a UE-specific search space of the terminal device and a first resource group.

After determining the first resource group, the first network device may further determine the first search space based on the UE-specific search space of the terminal device.

The first search space herein may be understood as an intersection set of the first resource group and the UE-specific search space. In other words, a resource in the first search space belongs to the first resource group and belongs to the UE-specific search space. For the network device, the first search space is a resource available for the first network device to send a first PDCCH. In other words, each network device sends a PDCCH to the terminal device only on a resource allocated to the network device. For the terminal device, the first search space may be transparent or nontransparent (this is because a first resource set may be transparent or nontransparent for the terminal device, and is described in detail below). Regardless of whether the first search space is transparent or nontransparent for the terminal device, the first search space is a part of the UE-specific search space. In other words, the first search space is a part of a search scope in which the terminal device performs blind detection.

It can be learned from the foregoing descriptions in S310 that, resources in resource groups of any two network devices do not overlap, and intersection sets that are determined in the two resource groups and that are of the UE-specific search space definitely do not overlap. In other words, the first search space corresponding to the first network device and a second search space corresponding to a second network device do not overlap. Therefore, a resource collision that may be caused when a plurality of network devices simultaneously send a plurality of PDCCHs to the terminal device can be avoided.

In a current LTE protocol, when determining a PDCCH search space $S_k^{(L)}$, the network device or the terminal device may determine the search space $S_k^{(L)}$ according to the following formula:

$$L\{(Y_k+m') \bmod \lfloor N_{CCE,k}/L \rfloor\}+i \qquad \text{formula (1)}$$

where $i=0, \ldots,$ or $L-1$, and $m=0, \ldots,$ or $M^{(L)}-1$. Definitions of L, $N_{CCE,k}$ and $M^{(L)}$ are described in detail above, and details are not described herein again. For a common search space, $m'=m$, and $Y_k$ is 0. For a user search space, $Y_k$ is defined as $Y_k=(A\cdot Y_{k-1}) \bmod D$, where $Y_{-1}=n_{RNTI}\neq 0$, $A=39827$, $D=65537$, $k=\lfloor n_s/2 \rfloor$, and $n_s$ is a slot number (whose value may range from 0 to 19) in a radio frame.

It can be learned that the UE-specific search space may be related to an identifier $n_{RNTI}$ of the terminal device. Therefore, UE-specific search spaces corresponding to different terminal devices may be different, but resources in the UE-specific search spaces corresponding to the different terminal devices may overlap in time-frequency domain.

However, after each CCE is occupied by a terminal device or network device, another terminal device or network device can no longer use the CCE resource. Therefore, in this embodiment of the present invention, the UE-specific search space of the terminal device is designed to include a plurality of subspaces, and the plurality of subspaces are discretely distributed in the plurality of resource groups.

Specifically, the UE-specific search space of the terminal device may be designed to be any one of the following designs:

Design 1: A quantity of CCEs included in each subspace depends on an aggregation level.

In the design 1, the quantity of CCEs included in each subspace may be the same as a value of the aggregation level. For example, AL=1, and the quantity of CCEs included in each subspace is 1. In this case, a quantity of the subspaces is the same as a quantity of PDCCH candidates.

Figure 7:
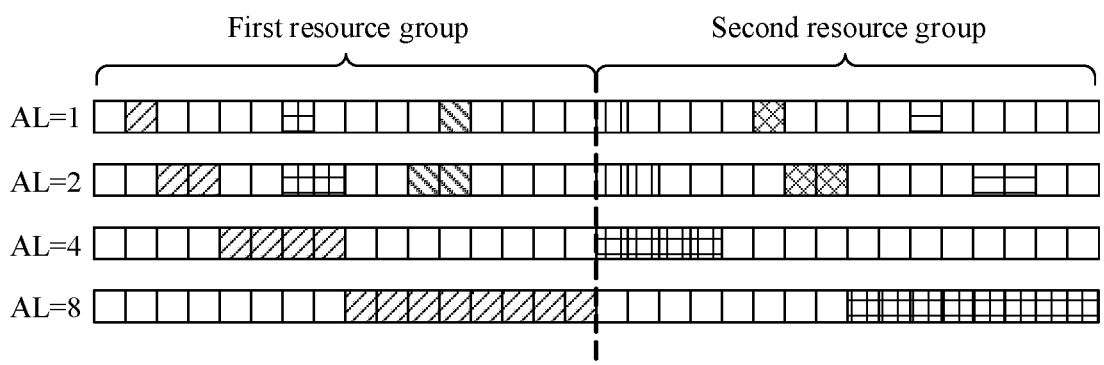
FIG. 7 is a schematic diagram of distribution of UE-specific search spaces at different aggregation levels according to an embodiment of the present invention.

FIG. 7 is a schematic diagram of distribution of UE-specific search spaces at different aggregation levels according to this embodiment of the present invention. As shown in FIG. 7, it is assumed that the UE-specific search spaces at different aggregation levels still use the quantities of PDCCH candidates in Table 1. When AL=1, each subspace includes one CCE, and the quantity of the subspaces is 6. When AL=2, each subspace includes two CCEs, and the quantity of the subspaces is 6. When AL=4, each subspace includes four CCEs, and the quantity of the subspaces is 2; and when AL=8, each subspace includes eight CCEs, and the quantity of the subspaces is 2.

Design 2: The quantity of the subspaces depends on the quantity of network devices accessed by the terminal device.

In the design 2, the quantity of the subspaces may be the same as the quantity of network devices accessed by the terminal device. For example, the terminal device accesses n network devices. In this case, the quantity of the subspaces may be n. Because a quantity of CCEs included in the UE-specific search space (namely, a size of a specific search space of the terminal device (namely, M CCEs)) may be calculated, that is, fixed, the quantity of CCEs included in each subspace may be M/n. When M cannot be exactly divided by n, M/n may be rounded up or rounded down.

Figure 8:
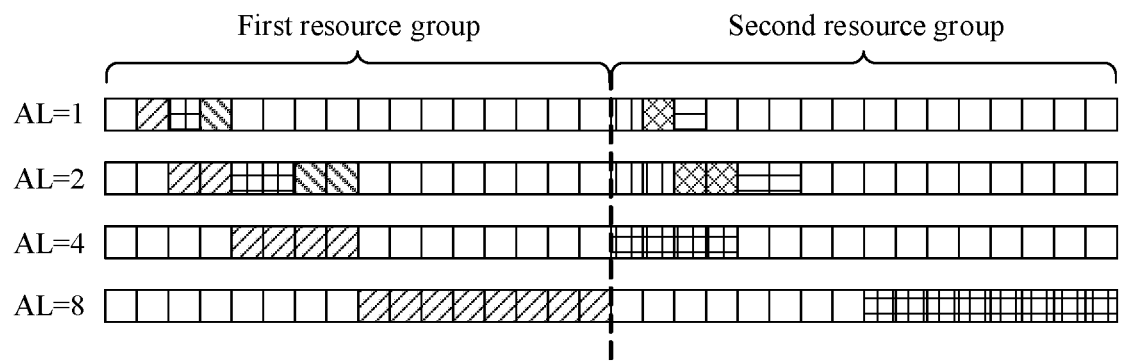
FIG. 8 is another schematic diagram of distribution of UE-specific search spaces at different aggregation levels according to an embodiment of the present invention.

FIG. 8 is another schematic diagram of distribution of UE-specific search spaces at different aggregation levels according to this embodiment of the present invention. As shown in FIG. 8, it is assumed that the UE-specific search spaces at different aggregation levels still use the search space sizes in Table 1, and the quantity of network devices accessed by the terminal device is 2. In this case, the quantity of subspaces may always be 2 at different aggregation levels. When AL=1, each subspace includes three CCEs. When AL=2, each subspace includes six CCEs. When AL=4, each subspace includes four CCEs. When AL=8, each subspace includes eight CCEs.

It should be understood that, the quantity of subspaces being the same as the quantity of network devices accessed by the terminal device is merely a possible implementation. For example, the quantity of subspaces may alternatively be greater than the quantity of network devices accessed by the terminal device.

It can be learned from the above that, according to the foregoing design, UE-specific search spaces can be discretely distributed in the plurality of resource groups. In other words, the UE-specific search spaces are distributed in the resource group allocated to each network device. The first network device may determine, based on the first resource group and the UE-specific search spaces, a resource location available for the first network device to send a PDCCH, namely, the first search space.

It should be noted that FIG. 7 and FIG. 8 show schematic diagrams of distribution of UE-specific search spaces at different aggregation levels only for ease of understanding. However, this does not mean that resources in the UE-specific search spaces of the terminal device occupy four subcarriers. Actually, at different aggregation levels, the UE-specific search spaces occupy resources on a same subcarrier, but occupy different CCEs at different aggregation levels. For ease of differentiation and understanding, occupation of CCEs at different aggregation levels are separately shown in the figures, and resources of one subcarrier are not configured for the UE-specific search spaces at each aggregation level. Therefore, the figures should not constitute any limitation on this embodiment of the present invention.

FIG. 7 and FIG. 8 show diagrams of distribution of the UE-specific search spaces when the design 1 and the design 2 are separately used when the quantity of network devices (for example, including the first network device and the second network device) is 2. The first network device may be the network device #1, and the second network device may be the network device #2. Resource groups corresponding to the first network device and the second network device are the first resource group and a second resource group respectively. Search spaces corresponding to the first network device and the second network device are the first search space and a second search space respectively. In the figures, locations on the left of a dashed line belong to the first resource group, and locations on the right of the dashed line belong to the second resource group. The first search space corresponds to a shadow area that is shown in the figure and that is on the left of the dashed line, and the second search space (namely, a resource location available for the second network device) corresponds to a shadow area that is shown in the figure and that is on the right of the dashed line.

It should be noted that the foregoing listed designs of the UE-specific search spaces are merely examples, and should not constitute any limitation on this embodiment of the present invention. A method for designing the UE-specific search spaces is not particularly limited in this embodiment of the present invention. Provided that in any design method, the UE-specific search spaces can be discretely distributed in the plurality of resource groups, the design method shall fall within the protection scope of this embodiment of the present invention.

It should be further noted that a calculation formula of the UE-specific search space may still use the prior art, or may be modified based on an existing technical formula, or may be a redefined calculation formula. This is not particularly limited in this embodiment of the present invention. For example, the formula (1) above may be modified. m' is redefined, m' is a discrete value in a range of $[0, \lfloor N_{CCE,k}/L \rfloor -1]$, and a quantity of m' is the quantity $M^{(L)}$ of PDCCH candidates.

S340. The first network device sends a first PDCCH to the terminal device in the first search space.

After determining the first search space, the first network device may send the first PDCCH to the terminal device on the resource. A specific method for sending the first PDCCH by the first network device may be the same as that in the prior art. For brevity, detailed description of the specific process is omitted herein.

S350. The terminal device blindly detects the first PDCCH on PDCCH candidates corresponding to different aggregation levels.

In this embodiment of the present invention, the network controller divides the control resource set, so that resource groups allocated to different network devices do not overlap. However, the resource groups may be transparent for the terminal device. In other words, the terminal device does not know a resource group corresponding to each network device, and can calculate the locations of the UE-specific search spaces based on a known calculation formula of a search space. Therefore, the terminal device may still use a blind detection method in the prior art to calculate the UE-specific search spaces based on different aggregation levels, and then attempt to receive the first PDCCH in the UE-specific search space until receiving the first PDCCH.

In one embodiment, the resource groups allocated to the network devices may alternatively be nontransparent for the terminal device.

In one embodiment, before S350, the method 300 further includes the following operation.

S360. The terminal device determines the plurality of resource groups in the preconfigured control resource set, and determines a plurality of search spaces based on the UE-specific search space and the plurality of resource groups.

Resources in any two of the plurality of resource groups do not overlap, and one search space may be determined based on each resource group and the UE-specific search space. Therefore, resources in any two search spaces do not overlap either.

The terminal device may determine the resource groups of the network devices in any one of the following manners.

Manner 1:

The terminal device receives a plurality of pieces of resource group indication information sent by a plurality of network devices. The plurality of pieces of resource group indication information correspond one-to-one to the plurality of network devices, and the resource group indication information is used to indicate a resource location of a resource group available for the network device. It has been described in S320 that, for ease of differentiation and description, to distinguish from the resource group indication information sent by the network controller to the network device, the resource group indication information sent by the network device to the terminal device is denoted as second indication information.

For example, the first network device sends the second indication information to the terminal device. The second indication information is used to indicate a location of the first resource group.

In one embodiment, each network device may send the second indication information to the terminal device by using signaling such as radio resource control (RRC) signaling or a media access control (MAC) control element, so that the terminal device determines the locations of the resource group allocated to the network device.

After determining the location of each resource group according to the second indication information, the terminal device may determine, based on the UE-specific search spaces and the resource group, the search space corresponding to each network device, and perform blind detection in the search space.

In this embodiment of the present invention, the first network device and the second network device respectively send a first PDCCH and a second PDCCH by using corresponding resources. The terminal device may determine the location of the first resource group and the location of the second resource group according to the second indication information separately sent by the first network device and the second network device. Then, the terminal device determines the first search space and the second search space based on the UE-specific search spaces. Therefore, the terminal device may sequentially or simultaneously attempt to receive the first PDCCH and the second PDCCH in the first search space and the second search space respectively based on different aggregation levels.

In one embodiment, the terminal device performs blind detection in different manners based on a computing capability of the terminal device. When the computing capability of the terminal device is relatively weak, the terminal device detects one search space at a time. To be specific, the terminal device may first perform blind detection in the first search space, and when finding a PDCCH of the terminal device, stops performing blind detection in the first search space. Then, the terminal device may perform blind detection in the second search space, and so on. When the computing capability of the terminal device is relatively strong, the terminal device may simultaneously perform blind detection in a plurality of search spaces. For each search space, when finding a PDCCH of the terminal device, the terminal device stops detection in the search space.

For example, the terminal device performs, in ascending order of aggregation levels, blind detection in the search spaces corresponding to the different aggregation levels. If the terminal device finds the first PDCCH in the first search space at an aggregation level (for example, AL=2) through blind detection, the terminal device may directly attempt to receive the second PDCCH in the second search space at another aggregation level (for example, AL=4 or 8). Therefore, this helps reduce a calculation amount of the terminal device.

Manner 2:

The terminal device may determine a plurality of resource groups in a preconfigured control resource set according to a predefined rule. The plurality of resource groups correspond one-to-one to a plurality of network devices.

In the manner 2, the terminal device may obtain in advance the pre-specified rule and the preconfigured control resource set (for example, preconfigured in the terminal device). The terminal device may determine a resource group of each network device in the control resource set according to the pre-specified rule, and further determine a search space of each PDCCH.

Specifically, the preset rule may be any one of the following rules.

Rule 1: Evenly allocate resources in the control resource set based on the quantity of network devices accessed by the terminal device, to obtain the plurality of resource groups.

Rule 2: Proportionally allocate resources in the control resource set based on channel quality of a plurality of channels between the terminal device and the plurality of network devices, to obtain the plurality of resource groups.

In the rule 2, it should be noted that the terminal device and the network controller need to allocate the resources in the control resource set based on same reference signal receiving power. Therefore, the network controller may send the reference signal receiving power to the terminal device by using each network device, so that the terminal device determines a resource allocation proportion. In one embodiment, the network devices may send the RSRP to the terminal device by using higher layer signaling.

A specific process in which the terminal device determines the plurality of resource groups according to the pre-specified rule is the same as the specific process in which the network controller determines the plurality of resource groups in S310. For brevity, details are not described herein.

It should be noted that, if a terminal device can determine search spaces of PDCCHs sent by a plurality of network devices, the terminal device may define a search space of the PDCCH sent by each network device as one search space, and UE-specific search space may include a plurality of search spaces.

It should be understood that sequence numbers of the foregoing processes do not mean an execution sequence in this embodiment of the present invention. The execution sequence of the processes should be determined based on functions and internal logic of the processes, and should not construct any limitation on the implementation processes of this embodiment of the present invention. For example, S360 may be performed before S350, may be performed before S340, or even may be performed simultaneously with S310, or may be performed before or after S310.

Therefore, in this embodiment of the present invention, the resource groups are allocated to the plurality of network devices from the preconfigured control resource set, and the plurality of resource groups do not overlap with each other. Resources used to send the PDCCHs are further determined in the resource groups. This can avoid a resource collision that may occur when the plurality of network devices send the plurality of PDCCHs to a same terminal device, thereby ensuring DCI transmission reliability, and helping improve data transmission reliability.

The control channel transmission method in the embodiments of the present invention is described in detail above with reference to FIG. 3 to FIG. 8. A network device, a network controller, and a terminal device in the embodiments of the present invention are described in detail below with reference to FIG. 9 to FIG. 14.

Figure 9:
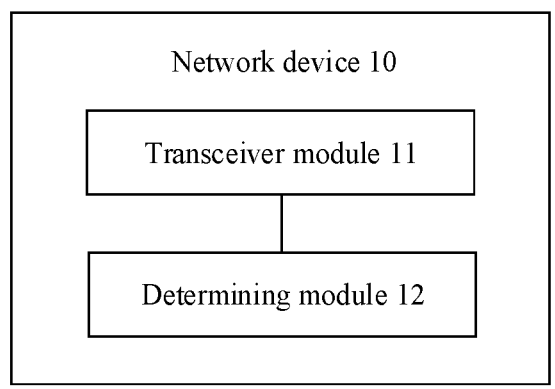
FIG. 9 is a schematic block diagram of a network device according to an embodiment of the present invention.

FIG. 9 is a schematic block diagram of a network device 10 according to an embodiment of the present invention. As shown in FIG. 9, the network device 10 includes a transceiver module 11 and a determining module 12.

Specifically, the transceiver module 11 is configured to receive resource group indication information sent by a network controller. A resource indicated by the resource group indication information does not overlap a resource used by another network device.

The determining module 12 is configured to determine a first search space based on a user equipment UE-specific search space of a terminal device and the resource group indication information.

The transceiver module 11 is further configured to send a first physical downlink control channel PDCCH to the terminal device through the first search space.

In one embodiment, the UE-specific search space of the terminal device includes a plurality of subspaces, and the plurality of subspaces are discretely distributed in the plurality of resource groups.

In one embodiment, the transceiver module 11 is further configured to send resource group indication information to the terminal device. The resource group indication information is used to indicate a resource location of a resource group used by the first network device.

It should be understood that the network device 10 may correspond to the first network device in the control channel transmission method 300 in the embodiments of the present invention. The network device 10 may include modules configured to perform a method performed by the first network device in the control channel transmission method 300 in FIG. 3. In addition, the modules in the network device 10 and the foregoing other operations and/or functions are intended to implement corresponding procedures of the control channel transmission method 300 in FIG. 3. Specifically, the transceiver module 11 is configured to perform S320 and S340 in the method 300, and the determining module 12 is configured to perform S330 in the method 300. A specific process of performing the foregoing corresponding operations by the modules has been described in detail in the method 300. For brevity, details are not described herein again.

Figure 10:
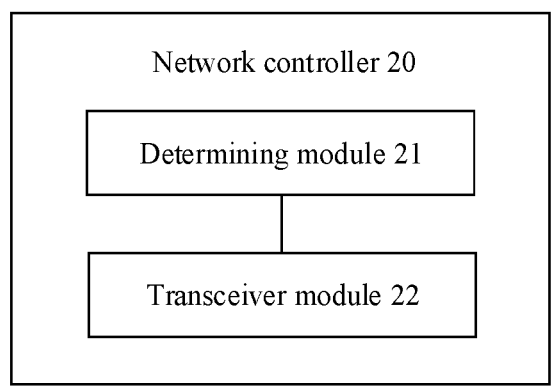
FIG. 10 is a schematic block diagram of a network controller according to an embodiment of the present invention.

FIG. 10 is a schematic block diagram of a network controller 20 according to an embodiment of the present invention. As shown in FIG. 10, the network controller 20 includes a determining module 21 and a transceiver module 22.

Specifically, the determining module 21 is configured to allocate, based on a quantity of network devices accessed by a terminal device, a plurality of resource groups from a preconfigured control resource set to the plurality of network devices accessed by the terminal device. The plurality of resource groups correspond one-to-one to the plurality of network devices, and resources in any two of the plurality of resource groups do not overlap.

The transceiver module 22 is configured to send a plurality of pieces of resource group indication information to the plurality of network devices. The plurality of pieces of resource group indication information correspond one-to-one to the plurality of network devices, and the resource group indication information is used to indicate a resource location of a resource group available for the network device.

In one embodiment, the determining module 21 is specifically configured to determine the plurality of resource groups in the preconfigured control resource set according to a preset rule and based on the quantity of network devices accessed by the terminal device.

The preset rule includes: evenly allocating resources in the control resource set based on the quantity of network devices accessed by the terminal device, to obtain the plurality of resource groups; or proportionally allocating resources in the control resource set based on channel quality of a plurality of channels between the terminal device and the plurality of network devices, to obtain the plurality of resource groups.

It should be understood that the network controller 20 may correspond to the network controller in the control channel transmission method 300 in the embodiments of the present invention. The network controller 20 may include modules configured to perform a method performed by the network controller in the control channel transmission method 300 in FIG. 3. In addition, the modules in the network controller 20 and the foregoing other operations and/or functions are respectively intended to implement corresponding procedures of the control channel transmission method 300 in FIG. 3. Specifically, the determining module 21 is configured to perform S310 in the method 300, and the transceiver module 22 is configured to perform S320 in the method 300. A specific process of performing the foregoing corresponding operations by the modules has been described in detail in the method 300. For brevity, details are not described herein again.

Figure 11:
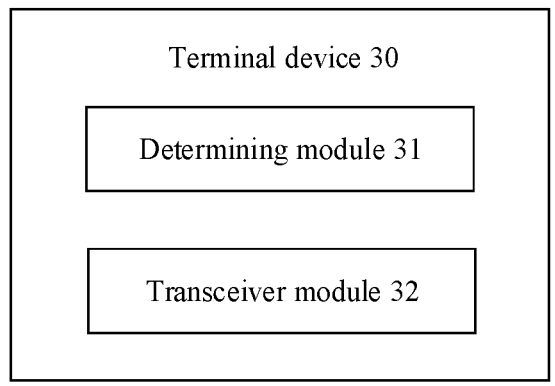
FIG. 11 is a schematic block diagram of a terminal device according to an embodiment of the present invention.

FIG. 11 is a schematic block diagram of a terminal device 30 according to an embodiment of the present invention. As shown in FIG. 11, the terminal device 30 includes a determining module 31 and a transceiver module 32.

Specifically, the determining module 31 is configured to determine a plurality of resource groups in a preconfigured control resource set. Resources in any two of the plurality of resource groups do not overlap.

The determining module 31 is further configured to determine a plurality of search spaces based on a user equipment UE-specific search space and the plurality of resource groups.

The transceiver module 32 is configured to receive, in the plurality of search spaces, a plurality of pieces of physical downlink control information PDCCHs sent by a plurality of network devices. The plurality of network devices correspond one-to-one to the plurality of PDCCHs.

In one embodiment, the determining module 31 is specifically configured to determine the plurality of resource groups in the preconfigured control resource set according to a preset rule and based on a quantity of network devices accessed by the terminal device.

The preset rule includes: evenly allocating resources in the control resource set based on the quantity of network devices accessed by the terminal device, to obtain the plurality of resource groups; or proportionally allocating resources in the control resource set based on channel quality of a plurality of channels between the terminal device and the plurality of network devices, to obtain the plurality of resource groups.

The transceiver module 32 is further configured to receive a plurality of pieces of resource group indication information sent by the plurality of network devices. The plurality of pieces of resource group indication information correspond one-to-one to the plurality of network devices, and the resource group indication information is used to indicate a resource location of a resource group available for the network device.

The determining module 31 is specifically configured to determine the plurality of resource groups according to the plurality of pieces of resource group indication information.

In one embodiment, the UE-specific search space of the terminal device includes a plurality of subspaces, and the plurality of subspaces are discretely distributed in the plurality of resource groups.

It should be understood that the terminal device 30 may correspond to the terminal device in the control channel transmission method 300 in the embodiments of the present invention. The terminal device 30 may include modules configured to perform a method performed by the terminal device in the control channel transmission method 300 in FIG. 3. In addition, the modules in the terminal device 30 and the foregoing other operations and/or functions are respectively intended to implement corresponding procedures of the control channel transmission method 300 in FIG. 3. Specifically, the determining module 31 is configured to perform S360 in the method 300, and the transceiver module 32 is configured to perform S350 in the method 300. A specific process of performing the foregoing corresponding operations by the modules has been described in detail in the method 300. For brevity, details are not described herein again.

Figure 12:
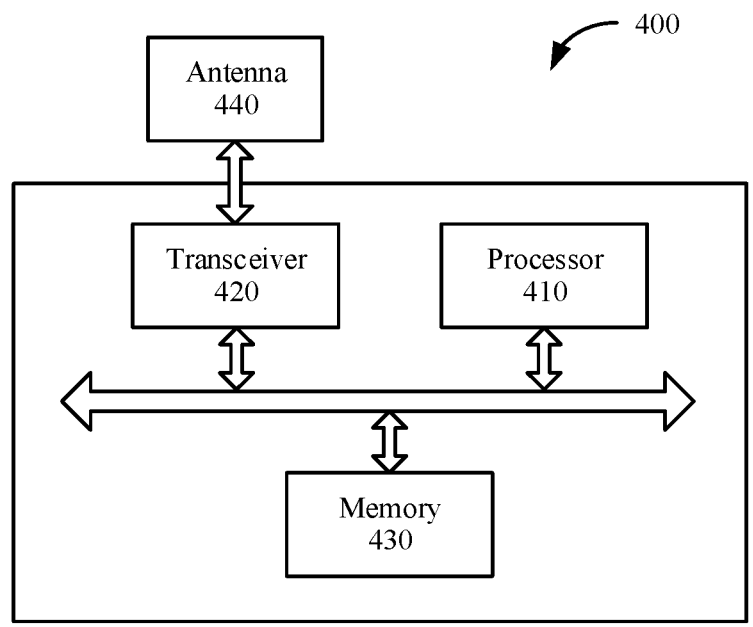
FIG. 12 is another schematic block diagram of a network device according to an embodiment of the present invention.

FIG. 12 is another schematic block diagram of a network device 400 according to an embodiment of the present invention. As shown in FIG. 12, the network device 400 includes a processor 410 and a transceiver 420. In one embodiment, the network device 400 further includes a memory 430. Through an internal connection path, the processor 410, the transceiver 420, and the memory 430 communicate with each other, and transfer a control signal and/or a data signal. The memory 430 is configured to store a computer program. The processor 410 is configured to invoke the computer program from the memory 430 and run the computer program, to control the transceiver 420 to send and receive a signal. When a program instruction stored in the memory 430 is executed by the processor 410, the processor 410 is configured to control the transceiver 420 to receive first indication information sent by a network controller. The first indication information is used to indicate a resource location of a first resource group available for the network device 400, and the first resource group is determined by the network controller in a preconfigured control resource set. The processor 410 is configured to determine a first search space based on a UE-specific search space of a terminal device and the first resource group. A resource in the first search space belongs to the UE-specific search space and belongs to the first resource group. The transceiver 420 is configured to send a first physical downlink control channel PDCCH to the terminal device through the first search space.

The processor 410 and the memory 430 may be combined into one processing apparatus. The processor 410 is configured to execute program code stored in the memory 430 to implement the foregoing functions. During specific implementation, the memory 430 may alternatively be integrated into the processor 410, or may be independent of the processor 410.

The network device may further include an antenna 440, configured to send, by using a radio signal, downlink data or downlink control signaling output by the transceiver 420. Specifically, the network device 400 may correspond to the network device in the control channel transmission method 300 in the embodiments of the present invention. The network device 400 may include units configured to perform a method performed by the network device in the control channel transmission method 300 in FIG. 3. In addition, the units in the network device 400 and the foregoing other operations and/or functions are intended to implement corresponding procedures of the control channel transmission method 300 in FIG. 3. Specifically, the memory 430 is configured to store program code, so that when the processor 410 executes the program code, the processor 410 controls the transceiver 420 to perform S320 and S340 in the method 300 by using the antenna 440, and performs S330 in the method 300. A specific process in which each module performs the foregoing corresponding operation has been described in detail in the method 300. For brevity, details are not described herein again.

Figure 13:
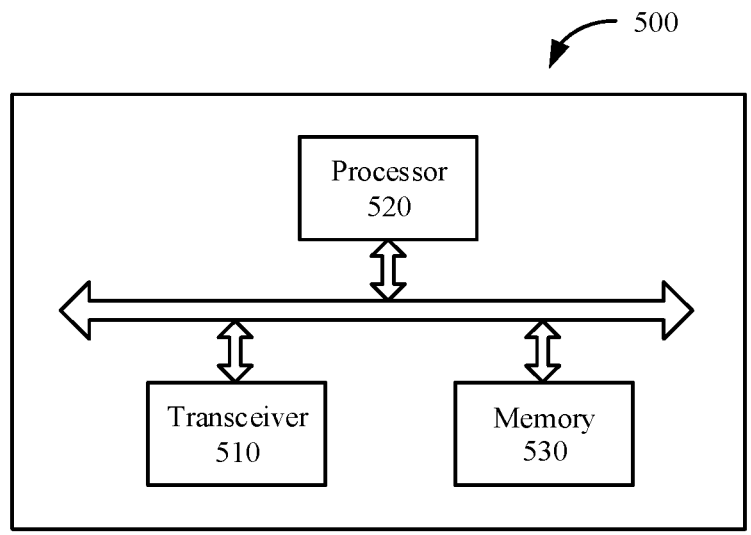
FIG. 13 is another schematic block diagram of a network controller according to an embodiment of the present invention.

FIG. 13 is another schematic block diagram of a network controller 500 according to an embodiment of the present invention. As shown in FIG. 13, the network controller 500 includes a transceiver 510 and a processor 520. In one embodiment, the network controller 500 further includes a memory 530. Through an internal connection path, the processor 510, the transceiver 520, and the memory 530 communicate with each other, and transfer a control signal and/or a data signal. The memory 530 is configured to store a computer program. The processor 510 is configured to invoke the computer program from the memory 530 and run the computer program, to control the transceiver 520 to send and receive a signal. When a program instruction stored in the memory 530 is executed by the processor 510, the processor 510 is configured to determine a plurality of resource groups in a preconfigured control resource set based on a quantity of network devices accessed by a terminal device. The plurality of resource groups correspond one-to-one to the plurality of network devices accessed by the terminal device. The resource group is available for the network device to send a physical downlink control channel PDCCH, and resources in any two of the plurality of resource groups do not overlap. The processor 510 is further configured to control the transceiver 520 to send a plurality of pieces of indication information to the plurality of network devices. The indication information is used to indicate a resource location of a resource group available for the network device, and the plurality of pieces of indication information correspond one-to-one to the plurality of network devices.

It should be understood that the network controller 500 may correspond to the network controller in the control channel transmission method 300 in the embodiments of the present invention. The network controller 500 may include modules configured to perform a method performed by the network controller in the control channel transmission method 300 in FIG. 3. In addition, the modules of the network controller 500 and the foregoing other operations and/or functions are intended to implement corresponding procedures of the control channel transmission method 300 in FIG. 3. Specifically, the memory 530 is configured to store program code, so that when the processor 510 executes the program code, the processor 510 performs S310 in the method 300, and controls the transceiver 520 to perform S320 in the method 300. A specific process in which each module performs the foregoing corresponding operation has been described in detail in the method 300. For brevity, details are not described herein again.

Figure 14:
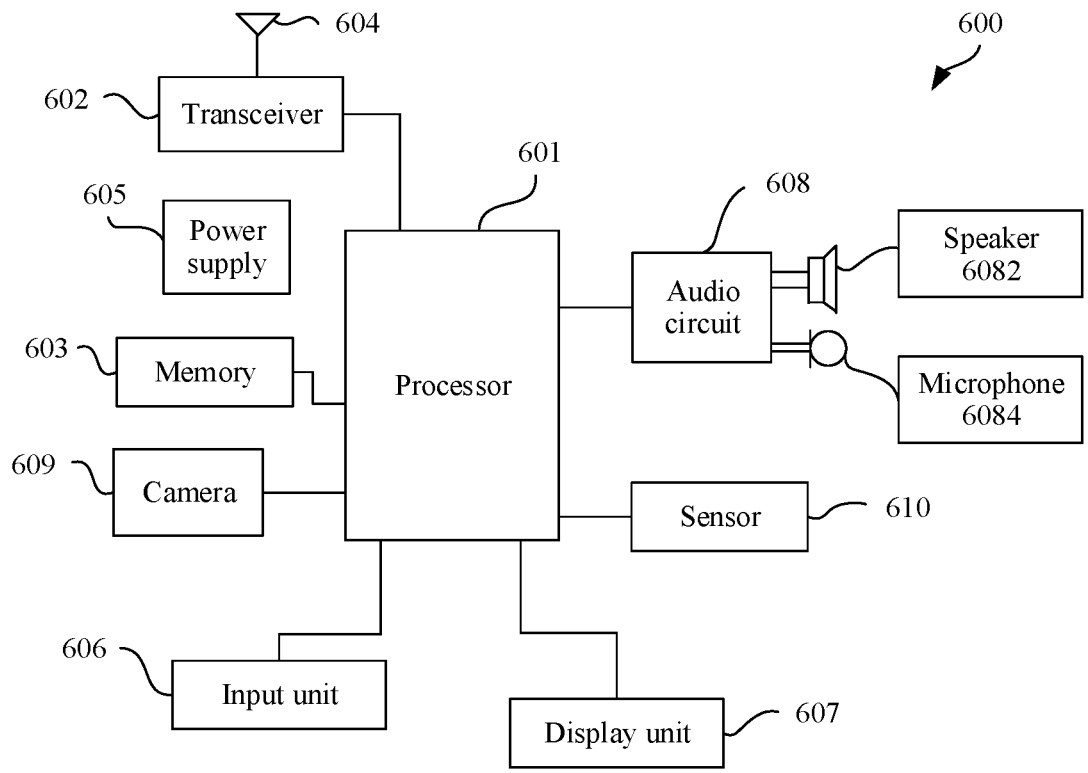
FIG. 14 is another schematic block diagram of a terminal device according to an embodiment of the present invention.

FIG. 14 is another schematic block diagram of a terminal device 600 according to an embodiment of the present invention. As shown in FIG. 14, the terminal device 600 includes a processor 601 and a transceiver 602. In one embodiment, the terminal device 600 further includes a memory 603. Through an internal connection path, the processor 601, the transceiver 602, and the memory 603 communicate with each other, and transfer a control signal and/or a data signal. The memory 603 is configured to store a computer program. The processor 601 is configured to invoke the computer program from the memory 603 and run the computer program, to control the transceiver 602 to send and receive a signal.

When a program instruction stored in the memory 603 is executed by the processor 601, the processor 601 is configured to determine a plurality of resource groups in a preconfigured control resource set. Any two of the plurality of resource groups do not overlap. The processor 601 is further configured to determine a plurality of search spaces based on a user equipment UE-specific search space and the plurality of resource groups. A resource in each search space belongs to the UE-specific search space and belongs to the resource group. The processor 601 is further configured to control the transceiver 602 to receive, in the plurality of search spaces, a plurality of pieces of physical downlink control information PDCCHs sent by a plurality of network devices. The plurality of network devices correspond one-to-one to the plurality of PDCCHs.

The processor 601 and the memory 603 may be combined into one processing apparatus. The processor 601 is configured to execute program code stored in the memory 603 to implement the foregoing functions. During specific implementation, the memory 603 may alternatively be integrated into the processor 601, or may be independent of the processor 601. The terminal device 600 may further include an antenna 604, configured to send, by using a radio signal, uplink data or uplink control signaling output by the transceiver 602.

It should be understood that the terminal device 600 may correspond to the terminal device in the control channel transmission method 300 in the embodiments of the present invention. The terminal device 600 may include modules configured to perform a method performed by the terminal device in the control channel transmission method 300 in FIG. 3. In addition, the modules of the terminal device 600 and the foregoing other operations and/or functions are intended to implement corresponding procedures of the control channel transmission method 300 in FIG. 3. Specifically, the memory 603 is configured to store program code, so that when the processor 601 executes the program code, the processor 610 performs S360 in the method 300, and controls the transceiver 602 to perform S350 in the method 300. A specific process in which each module performs the foregoing corresponding operation has been described in detail in the method 300. For brevity, details are not described herein again.

The processor 601 may be configured to perform an action implemented inside the terminal in the foregoing method embodiments, and the transceiver 602 may be configured to perform an action of transmission or sending from the terminal to the network device in the foregoing method embodiments. For details, refer to the descriptions in the foregoing method embodiments. Details are not described herein.

The processor 601 and the memory 603 may be integrated into one processing apparatus. The processor 601 is configured to execute the program code stored in the memory 603 to implement the foregoing functions. During specific implementation, the memory 603 may alternatively be integrated into the processor 601.

The terminal device 600 may further include a power supply 605, configured to supply power to various components or circuits in the terminal.

In addition, to make functions of the terminal device more perfect, the terminal device 600 may further include one or more of an input unit 606, a display unit 607, an audio circuit 608, a camera 609, a sensor 610, and the like, and the audio circuit may further include a speaker 6082, a microphone 6084, and the like.

It should be understood that, the processor in the embodiments of the present invention may be a central processing unit (CPU), or may be another general purpose processor, a digital signal processor (DSP), an application-specific integrated circuit (ASIC), a field programmable gate array (FPGA) or another programmable logical device, discrete gate or transistor logical device, discrete hardware component, or the like.

It may further be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by the computer, or a data storage device, such as a server or a data center, including one or more usable medium sets. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of control channel transmission, comprising:
receiving, by a first network device of a plurality of network devices, a piece of resource group indication information from a network controller;
determining, by the first network device, a first search space based on a search space specific to a terminal device and the piece of resource group indication information, wherein the search space comprises a plurality of subspaces, each of the plurality of subspaces corresponding to a different one of a plurality of resource groups, wherein resources in any two of the plurality of resource groups do not overlap, where each of the plurality of resource groups is allocated to a different one of the plurality of network devices, wherein the plurality of resource groups are determined according to a preset rule and a quantity of the plurality of network devices, the preset rule comprising evenly allocating resources in a preconfigured control resource set based on the quantity of the plurality of network devices to obtain the plurality of resource groups, or proportionally allocating resources in the preconfigured control resource set based on channel quality of a plurality of channels between the terminal device and the plurality of network devices to obtain the plurality of resource groups; and
sending, by the first network device, a first physical downlink control channel (PDCCH) to the terminal device through the first search space.

2. The method according to claim 1, wherein the plurality of subspaces are discretely distributed in the plurality of resource groups.

3. The method according to claim 1, wherein the method further comprises:
sending, by the first network device, the piece of resource group indication information to the terminal device, wherein the piece of resource group indication information indicates a resource location of a resource group corresponding to the first network device.

4. The method according to claim 1, wherein each of the plurality of subspaces in the search space specific to the terminal device includes a plurality of control channel elements (CCEs), and a quantity of the plurality of CCEs depends on an aggregation level.

5. The method according to claim 4, wherein the quantity of CCEs in the subspace is equal to a value of the aggregation level, and the search space specific to the terminal device are eventually distributed in the preconfigured control resource set.

6. The method according to claim 4, wherein each of the plurality of subspaces in the search space specific to the terminal device includes a plurality of control channel elements (CCEs), and a quantity of the plurality of CCEs depends on the quantity of the plurality of network devices.

7. The method according to claim 6, wherein the CCEs included in the subspace are continuous, and the plurality of subspaces are discretely distributed in the preconfigured control resource set.

8. A method of control channel transmission, comprising:
allocating, by a network controller based on a quantity of a plurality of network devices accessed by a terminal device, a plurality of resource groups to the plurality of network devices from a preconfigured control resource set, wherein the plurality of resource groups are determined according to a preset rule and the quantity of the plurality of network devices, the preset rule comprising evenly allocating resources in the preconfigured control resource set based on the quantity of the plurality of network devices to obtain the plurality of resource groups, or proportionally allocating resources in the preconfigured control resource set based on channel quality of a plurality of channels between the terminal device and the plurality of network devices to obtain the plurality of resource groups, wherein the plurality of resource groups correspond one-to-one to the plurality of network devices, and resources in any two of the plurality of resource groups do not overlap; and
sending, by the network controller, a plurality of pieces of resource group indication information to the plurality of network devices, wherein the plurality of pieces of resource group indication information correspond one-to-one to the plurality of network devices, and each piece of the plurality pieces of resource group indication information indicates a resource location of a resource group available for a corresponding network device.

9. The method according to claim 8, wherein each of the plurality of network devices corresponds to a different one of a plurality of subspaces in a search space specific to the terminal device, wherein each of the plurality of subspaces in the search space specific to the terminal device includes a plurality of control channel elements (CCEs), and a quantity of the plurality of CCEs depends on an aggregation level.

10. The method according to claim 9, wherein the quantity of CCEs in the subspace is equal to a value of the aggregation level, and the search space specific to the terminal device are eventually distributed in the preconfigured control resource set.

11. The method according to claim 9, wherein each of the plurality of subspaces in the search space specific to the terminal device includes a plurality of control channel elements (CCEs), and a quantity of the plurality of CCEs depends on the quantity of the plurality of network devices.

12. The method according to claim 11, wherein the CCEs included in the subspace are continuous, and the plurality of subspaces are discretely distributed in the preconfigured control resource set.

13. A method of control channel transmission, comprising:
- determining, by a terminal device, a plurality of resource groups in a preconfigured control resource set, wherein the plurality of resource groups are determined according to a preset rule and a quantity of a plurality of network devices, the preset rule comprising evenly allocating resources in the preconfigured control resource set based on the quantity of the plurality of network devices to obtain the plurality of resource groups, or proportionally allocating resources in the preconfigured control resource set based on channel quality of a plurality of channels between the terminal device and the plurality of network devices to obtain the plurality of resource groups, wherein the plurality of resource groups correspond one-to-one to a plurality of network devices accessed by the terminal device, and resources in any two of the plurality of resource groups do not overlap;
- determining, by the terminal device, a plurality of search spaces based on a search space specific to the terminal device and the plurality of resource groups; and
- receiving, by the terminal device in the plurality of search spaces, a plurality of pieces of physical downlink control information (PDCCHs) sent by the plurality of network devices, wherein the plurality of network devices correspond one-to-one to the plurality of pieces of PDCCHs.

14. The method according to claim 13, wherein the determining, by the terminal device, of the plurality of resource groups in the preconfigured control resource set comprises:
- receiving, by the terminal device, a plurality of pieces of resource group indication information sent by the plurality of network devices, wherein the plurality of pieces of resource group indication information correspond one-to-one to the plurality of network devices, and each piece of the plurality of pieces of resource group indication information indicates a resource location of a resource group available for a corresponding network device.

15. The method according to claim 13, wherein the search space specific to the terminal device comprises a plurality of subspaces, which are discretely distributed in the plurality of resource groups.

16. The method according to claim 13, wherein each of the plurality of subspaces in the search space specific to the terminal device includes a plurality of control channel elements (CCEs), and a quantity of the plurality of CCEs depends on an aggregation level.

17. The method according to claim 16, wherein the quantity of CCEs in the subspace is equal to a value of the aggregation level, and the search space specific to the terminal device are eventually distributed in the preconfigured control resource set.

18. The method according to claim 16, wherein each of the plurality of subspaces in the search space specific to the terminal device includes a plurality of control channel elements (CCEs), and a quantity of the plurality of CCEs depends on the quantity of the plurality of network devices.

19. The method according to claim 18, wherein the CCEs included in the subspace are continuous, and the plurality of subspaces are discretely distributed in the preconfigured control resource set.

* * * * *